US010099177B2

(12) United States Patent
Yasuda et al.

(10) Patent No.: US 10,099,177 B2
(45) Date of Patent: Oct. 16, 2018

(54) DESULFURIZATION METHOD FOR GAS CONTAINING SULFUR OXIDE AND DESULFURIZATION APPARATUS

(71) Applicant: CHIYODA CORPORATION, Yokohama-shi, Kanagawa (JP)

(72) Inventors: Hirokazu Yasuda, Yokohama (JP); Noboru Takei, Yokohama (JP); Naobumi Kurosaki, Yokohama (JP)

(73) Assignee: CHIYODA CORPORATION, Yokohama-shi (JP)

( * ) Notice: Subject to any disclaimer, the term of this patent is extended or adjusted under 35 U.S.C. 154(b) by 0 days.

(21) Appl. No.: 15/026,781

(22) PCT Filed: Aug. 25, 2014

(86) PCT No.: PCT/JP2014/004361
§ 371 (c)(1),
(2) Date: Apr. 1, 2016

(87) PCT Pub. No.: WO2015/049827
PCT Pub. Date: Apr. 9, 2015

(65) Prior Publication Data
US 2016/0236142 A1 Aug. 18, 2016

(30) Foreign Application Priority Data

Oct. 3, 2013 (JP) .................................. 2013-208192

(51) Int. Cl.
*B01D 53/78* (2006.01)
*B01D 53/50* (2006.01)
*B01D 53/14* (2006.01)

(52) U.S. Cl.
CPC ............. *B01D 53/78* (2013.01); *B01D 53/14* (2013.01); *B01D 53/502* (2013.01);
(Continued)

(58) Field of Classification Search
None
See application file for complete search history.

(56) References Cited

U.S. PATENT DOCUMENTS 5,298,043 A * 3/1994 Mai ...................... B01D 50/004
96/240
5,645,802 A * 7/1997 Yanagioka ............. B01D 47/06
261/115
(Continued)

FOREIGN PATENT DOCUMENTS

GB 1495452 * 2/1975
JP 6-165912 A 6/1994
(Continued)

OTHER PUBLICATIONS

International Search Report dated Nov. 18, 2014, issued in counterpart International Application No. PCT/JP2014/004361 (2 pages).
(Continued)

*Primary Examiner* — Sheng H Davis
(74) *Attorney, Agent, or Firm* — Westerman, Hattori, Daniels & Adrian, LLP

(57) ABSTRACT

Provided is a desulfurization method for sulfur oxide gas that includes: bringing a first sulfur oxide gas into contact with a humidifying liquid to obtain a second gas; separating at least part of the humidifying liquid from the second gas to obtain a third gas; contacting the third gas with an alkaline agent-containing liquid and oxygen to remove sulfur oxide from the third gas; using the alkaline agent-containing liquid as the humidifying liquid to be brought into contact with the first gas in the humidifying liquid contact step; acquiring at least part of the humidifying liquid separated from the second gas; removing gas from the humidifying liquid; and recovering a by-product, the alkaline agent-containing liquid, and oxygen from the humidifying liquid from which the gas has been removed in the gas removal step, the by-
(Continued)

product recovery step being performed only downstream of the humidifying liquid acquisition step.

3 Claims, 7 Drawing Sheets

(52) U.S. Cl.
CPC ...... *B01D 53/504* (2013.01); *B01D 2251/404* (2013.01); *B01D 2251/606* (2013.01); *B01D 2252/103* (2013.01); *B01D 2257/302* (2013.01); *B01D 2258/0283* (2013.01)

(56) References Cited

U.S. PATENT DOCUMENTS

| | | | | |
|---|---|---|---|---|
| 5,686,053 | A | * 11/1997 | Kikkawa | B01D 53/508 422/168 |
| 6,001,154 | A | * 12/1999 | Kotake | B01D 53/504 95/235 |
| 6,138,378 | A | * 10/2000 | Takashina | B01D 53/1412 34/131 |
| 9,115,895 | B2 | * 8/2015 | Okamoto | B01D 53/501 |
| 2013/0108535 | A1 | 5/2013 | Okamoto et al. | |

FOREIGN PATENT DOCUMENTS

| | | |
|---|---|---|
| JP | 6-285326 A | 10/1994 |
| JP | 7-275651 A | 10/1995 |
| JP | 8-299754 A | 11/1996 |

OTHER PUBLICATIONS

Notification of Transmittal of Translation of the International Preliminary Report on Patentability (Forms PCT/IB/338) issued in counterpart International Application No. PCT/JP2014/004361 dated Apr. 14, 2016 with Forms PCT/IB/373, PCT/ISA/ 237, PCT/IB/326, with chapter I English translation. (15 pages).

Office Action dated Jun. 7, 2018, issued in counterpart Indian Application No. 201647014567, with English translation. (6 pages).

\* cited by examiner

DESULFURIZATION METHOD FOR GAS CONTAINING SULFUR OXIDE AND DESULFURIZATION APPARATUS

TECHNICAL FIELD

The present invention relates to a desulfurization method for a gas containing sulfur oxide and a desulfurization apparatus.

BACKGROUND ART

A combustion exhaust gas discharged from a coal-fired furnace or a coal-fired thermal power plant contains sulfur oxide (SOx), and a desulfurization apparatus is installed in order to treat sulfur oxide (SOx). As a method of removing sulfur oxide from a gas containing sulfur oxide in the desulfurization apparatus, there is given a method involving allowing the gas containing sulfur oxide to react with an alkaline agent and oxygen in an absorbing liquid. Waste water generated in such method of removing sulfur oxide contains a nitrogen compound and a chemical oxygen demand (COD) component, and hence waste water treatment is performed for their removal. However, there is a problem of degradation in performance of a waste water treatment apparatus for the waste water treatment.

As a technology for solving the above-mentioned problem, in Patent Literature 1, there is disclosed "a wet-type flue-gas desulfurization method, including: using a soot-mixing wet-type flue-gas desulfurization apparatus in order to remove sulfur oxide in an exhaust gas; and performing first gas-liquid contact and then second gas-liquid contact in a series in regions adjacent to each other, the first gas-liquid contact including spraying a first alkaline agent-containing liquid to an exhaust gas to allow gas-liquid contact therebetween, the second gas-liquid contact including allowing gas-liquid contact between the exhaust gas after the first gas-liquid contact and a second alkaline agent-containing liquid containing an absorber to remove mainly sulfur oxide in the exhaust gas in the presence of an oxygen-containing gas for oxidation of sulfur oxide, the wet-type flue-gas desulfurization method including: extracting a slurry containing solid matter generated through the second gas-liquid contact to use at least part thereof as the first alkaline agent-containing liquid; extracting the first alkaline agent-containing liquid spontaneously separated from the exhaust gas after the first gas-liquid contact through precipitation separation; and feeding the extracted first alkaline agent-containing liquid to a waste water treatment apparatus subsequent to the soot-mixing wet-type flue-gas desulfurization apparatus." According to the method disclosed in Patent Literature 1, the concentration of an oxidizing substance, such as a peroxide, in the waste water can be reduced. As a result, degradation in performance of the waste water treatment apparatus can be suppressed.

CITATION LIST

Patent Literature

PTL 1: Japanese Patent Application Laid-Open No. 8-299754

SUMMARY OF INVENTION

Technical Problem

However, the method and the apparatus disclosed in Patent Literature 1, in which a by-product, such as gypsum, generated through a sulfur oxide removal reaction involving allowing sulfur oxide to react with oxygen and the alkaline agent-containing liquid is removed through a plurality of paths, are complicated. Therefore, there is a demand for a simpler method and apparatus. In addition, there is also a demand for recovery of the by-product at a high recovery rate and a high purity because the by-product can be used separately.

It should be noted that a possible approach to improving removal performance of sulfur oxide in the gas is to promote an oxidation reaction or increase a pH in the sulfur oxide removal reaction. However, when the oxidation reaction is promoted or the pH is increased, the problem of degradation in performance of the waste water treatment apparatus and a problem of a reduction in purity of the by-product owing to an increase in concentration of an alkaline substance in the by-product become particularly remarkable.

In view of the above-mentioned problems, an object of the present invention is to provide a desulfurization method for a gas containing sulfur oxide and a desulfurization apparatus which have a simple configuration, are reduced in a load on waste water treatment device, and enable recovery of a by-product at a high recovery rate and a high purity.

Solution to Problem

As a result of extensive investigations, the inventors of the present invention have found that the above-mentioned object can be achieved by a configuration including: circulating an alkaline agent-containing liquid brought into contact with a gas containing sulfur oxide, which is a gas to be treated, and oxygen to use the alkaline agent-containing liquid as a humidifying liquid to be brought into contact with the gas to be treated in a stage prior to a reaction among the gas to be treated, oxygen, and the alkaline agent-containing liquid; separating the humidifying liquid from the gas to be treated brought into contact with the humidifying liquid; extracting the separated humidifying liquid; removing a gas inhibiting pump action or the like; and performing an operation of recovering a by-product generated through a reaction among sulfur oxide, oxygen, and the alkaline agent-containing liquid only on the humidifying liquid extracted after the separation. Thus, the present invention has been completed.

A desulfurization method for a gas containing sulfur oxide according to one embodiment of the present invention as described above includes: a humidifying liquid contact step of bringing a first gas containing sulfur oxide into contact with a humidifying liquid to obtain a second gas; a humidifying liquid separation step of separating at least part of the humidifying liquid from the second gas to obtain a third gas; a sulfur oxide removal step of bringing the third gas into contact with an alkaline agent-containing liquid and oxygen to remove the sulfur oxide from the third gas; a circulation step of circulating the alkaline agent-containing liquid brought into contact with the third gas and oxygen to use the alkaline agent-containing liquid as the humidifying liquid to be brought into contact with the first gas in the humidifying liquid contact step; a humidifying liquid acquisition step of acquiring at least part of the humidifying liquid separated from the second gas in the humidifying liquid separation step; a gas removal step of removing a gas from the humidifying liquid acquired in the humidifying liquid acquisition step; and a by-product recovery step of recovering a by-product generated through a reaction among the sulfur oxide, the alkaline agent-containing liquid, and oxygen from the humidifying liquid from which the gas has been removed in the gas removal step, the by-product recovery step being performed only downstream of the humidifying liquid acquisition step.

In addition, the humidifying liquid acquisition step may include adding oxygen to the humidifying liquid to allow the oxygen, the sulfur oxide in the humidifying liquid, and the alkaline agent-containing liquid to react with each other, to thereby generate a by-product and reduce an amount of the sulfur oxide in the humidifying liquid.

The sulfur oxide may include $SO_2$, the alkaline agent may be calcium carbonate, and the by-product may be gypsum.

A desulfurization apparatus for a gas containing sulfur oxide according to one embodiment of the present invention includes: a reaction tank; gas introduction device for introducing a first gas containing sulfur oxide, which is a gas to be treated, to the reaction tank; humidifying liquid contact device for bringing the first gas into contact with a humidifying liquid; humidifying liquid separation device for separating at least part of the humidifying liquid from a second gas obtained by the bringing the first gas into contact with a humidifying liquid; sulfur oxide removal device for bringing a third gas obtained by the separating at least part of the humidifying liquid from a second gas into contact with an alkaline agent-containing liquid and oxygen to remove the sulfur oxide from the third gas; gas discharge device for discharging, from the reaction tank, the third gas from which the sulfur oxide has been removed by the sulfur oxide removal device; circulation device for circulating the alkaline agent-containing liquid brought into contact with the third gas and oxygen by the sulfur oxide removal device to use the alkaline agent-containing liquid as the humidifying liquid to be brought into contact with the first gas by the humidifying liquid contact device; humidifying liquid acquisition device for acquiring at least part of the humidifying liquid separated by the humidifying liquid separation device; gas removal device for removing a gas from the humidifying liquid acquired by the humidifying liquid acquisition device; and by-product recovery device for recovering a by-product generated through a reaction among the sulfur oxide, the alkaline agent-containing liquid, and oxygen from the humidifying liquid from which the gas has been removed by the gas removal device, in which the by-product recovery device is arranged only downstream of the humidifying liquid acquisition device.

The humidifying liquid separation device may include a liquid descending pipe for feeding the humidifying liquid separated from the second gas to the humidifying liquid acquisition device, and the humidifying liquid acquisition device may include a pot surrounding an end of the liquid descending pipe on an outlet side.

The humidifying liquid acquisition device may include oxygen supply device for supplying oxygen into the pot.

The pot may include in an inside thereof a tilted plate for allowing the humidifying liquid to descend thereon obliquely in a vertical direction, and the humidifying liquid acquisition device may include a pipe for acquiring the humidifying liquid from a central portion of the tilted plate in the vertical direction.

A desulfurization apparatus according to one embodiment of the present invention includes: a reaction tank including: a humidifying liquid contact chamber communicating with an introduction port for a gas to be treated for introducing a gas to be treated; and an alkaline agent-containing liquid chamber for accommodating an alkaline agent-containing liquid in a lower portion thereof, the alkaline agent-containing liquid chamber communicating with a discharge port for a gas to be treated for discharging the gas to be treated, and with the humidifying liquid contact chamber, and being arranged below the humidifying liquid contact chamber; a humidifying liquid supply pipe for spraying a humidifying liquid to the gas to be treated; a first oxygen supply pipe for supplying oxygen into the alkaline agent-containing liquid accommodated in the alkaline agent-containing liquid chamber; circulation device for extracting the alkaline agent-containing liquid accommodated in the alkaline agent-containing liquid chamber and supplying the alkaline agent-containing liquid to the humidifying liquid supply pipe; a liquid descending pipe for allowing the humidifying liquid spontaneously separated from the gas to be treated to which the humidifying liquid has been sprayed to descend therethrough, the liquid descending pipe being arranged so as to extend downward from a bottom surface of the humidifying liquid contact chamber and reach below a liquid level of the alkaline agent-containing liquid accommodated in the alkaline agent-containing liquid chamber; a gas descending pipe for allowing the gas to be treated, the gas being obtained by spontaneously separating the humidifying liquid from the gas to be treated to which the humidifying liquid has been sprayed, to descend therethrough to be dispersed in the alkaline agent-containing liquid accommodated in the alkaline agent-containing liquid chamber, the gas descending pipe being arranged so as to extend downward from the bottom surface of the humidifying liquid contact chamber and reach below the liquid level of the alkaline agent-containing liquid accommodated in the alkaline agent-containing liquid chamber; a pot including a side wall surrounding a lower end portion of the liquid descending pipe from a side; a second oxygen supply pipe for supplying oxygen into the pot; a pipe for extracting the humidifying liquid from an inside of the pot; an air separator arranged in the pipe for extracting the humidifying liquid from an inside of the pot; and solid-liquid separation device arranged downstream of the air separator.

A desulfurization apparatus according to one embodiment of the present invention includes: a reaction tank configured such that: a gas to be treated is introduced from an introduction port for a gas to be treated arranged at an upper surface thereof; the gas to be treated is discharged from a discharge port for a gas to be treated arranged at a side wall thereof; and an alkaline agent-containing liquid is accommodated in a lower portion thereof; a humidifying liquid supply pipe for spraying a humidifying liquid to the gas to be treated, the humidifying liquid supply pipe being arranged in an upper portion of the reaction tank; a first oxygen supply pipe for supplying oxygen into the alkaline agent-containing liquid accommodated in the reaction tank; circulation device for extracting the alkaline agent-containing liquid accommodated in the reaction tank and supplying the alkaline agent-containing liquid to the humidifying liquid supply pipe; a separation plate including: an inclined plate of a doughnut shape, the inclined plate being arranged below the humidifying liquid supply pipe in the reaction tank and inclined downward toward a central portion thereof; a funnel-shaped liquid collector of a doughnut shape having an outer diameter larger than an inner diameter of the inclined plate, the funnel-shaped liquid collector being inclined downward toward a central portion thereof; and a liquid descending pipe for allowing the humidifying liquid spontaneously separated from the gas to be treated to which the humidifying liquid has been sprayed to descend therethrough, the liquid descending pipe being arranged so as to be connected to a hole of the funnel-shaped liquid collector in the central portion and reach below a liquid level of the alkaline agent-containing liquid accommodated in the reaction tank; a pot including a side wall surrounding a lower end portion of the liquid descending pipe from a side; a second oxygen supply pipe for supplying oxygen into the pot; a pipe for extracting the humidifying liquid from an inside of the pot; an air separator arranged in the pipe for extracting the humidifying liquid from an inside of the pot; and solid-liquid separation device arranged downstream of the air separator.

Advantageous Effects of Invention

According to the embodiments of the present invention, a reduction in a load on waste water treatment device and recovery of a by-product generated through a reaction among sulfur oxide, oxygen, and an alkaline agent-containing liquid at a high recovery rate and a high purity can be achieved by a simple configuration in which the by-product is recovered through only one path in desulfurization of a gas containing sulfur oxide by performing the specific separation step, circulation step, extraction step, gas removal step, and the like.

DESCRIPTION OF EMBODIMENTS

First Embodiment

Figure 1:
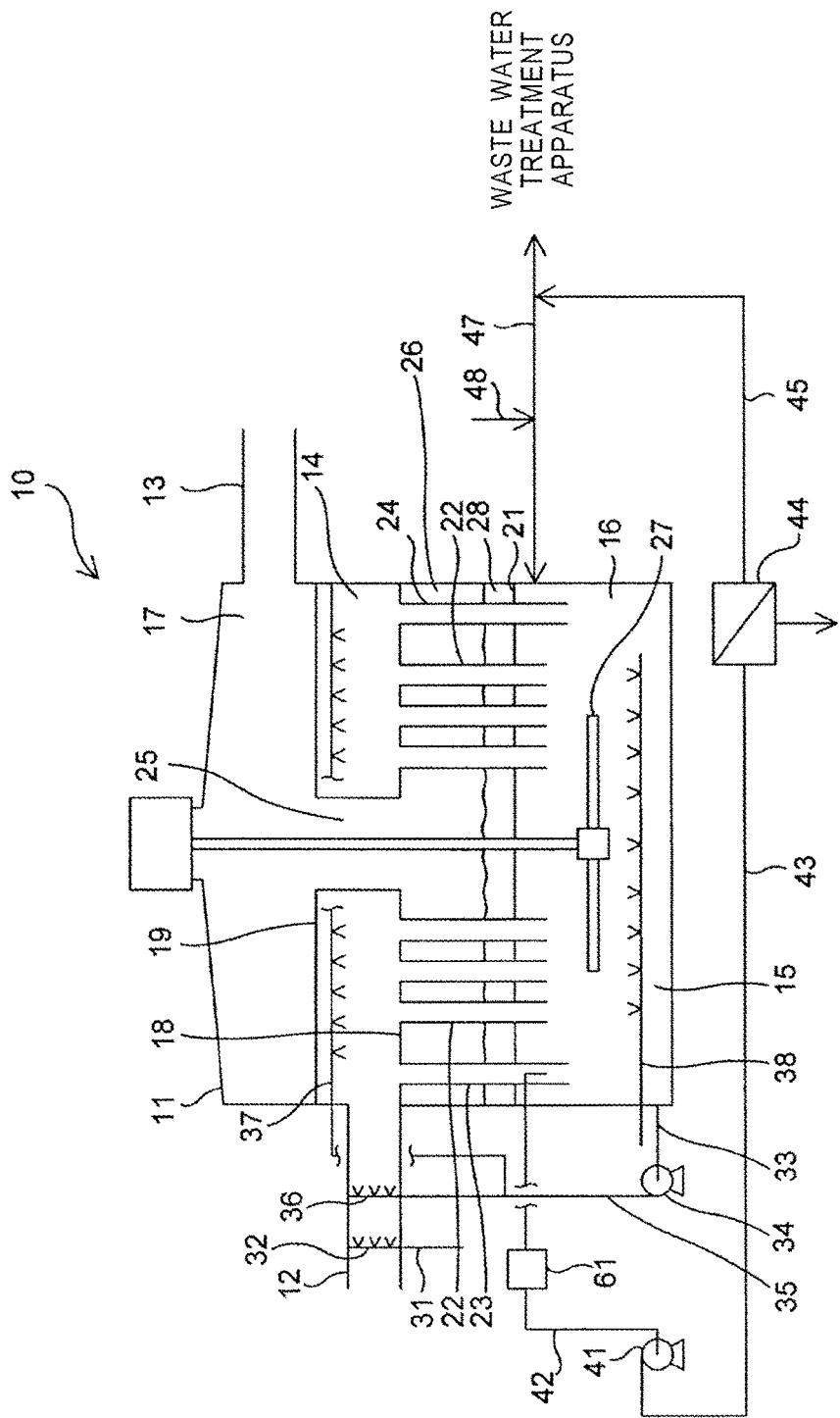
FIG. 1 is a schematic view for illustrating an example of a jet bubbling-type desulfurization apparatus to which a desulfurization method for a gas containing sulfur oxide of the present invention can be applied.

A desulfurization apparatus to which a desulfurization method for a gas containing sulfur oxide of the present invention can be applied is described with reference to FIG. 1. FIG. 1 is a schematic view for illustrating an example of a jet bubbling-type desulfurization apparatus to which a desulfurization method for a gas containing sulfur oxide according to a first embodiment of the present invention can be applied. A jet bubbling type refers to a mode in which an alkaline agent-containing liquid for removing sulfur oxide is accommodated in a lower portion of a reaction tank, and a gas to be treated and oxygen are introduced into the alkaline agent-containing liquid to allow gas-liquid contact between the gas to be treated and the alkaline agent-containing liquid, to thereby form a jet bubbling layer and cause a reaction therebetween.

In addition, in the present invention, as sulfur oxide (SOx), there is given, for example, sulfur dioxide in various forms, such as a sulfurous acid gas or the sulfurous acid gas dissolved in water. Moreover, as the gas containing sulfur oxide, there is given, for example, a combustion exhaust gas discharged from a coal-fired furnace or a coal-fired thermal power plant.

As illustrated in FIG. 1, a jet bubbling-type desulfurization apparatus 10 includes: a cylindrical jet bubbling-type reaction tank 11; an introduction port 12 for a gas to be treated for introducing a gas to be treated (first gas) into the reaction tank 11, the introduction port 12 being arranged near the central portion of a side wall of the reaction tank 11; and a discharge port 13 for a gas to be treated for discharging, from the reaction tank 11, the gas to be treated subjected to desulfurization treatment in the reaction tank 11, the discharge port 13 being arranged at an upper portion of the side wall of the reaction tank 11. The introduction port 12 for a gas to be treated and the discharge port 13 for a gas to be treated correspond to the "gas introduction device" and the "gas discharge device" in the claims, respectively.

The reaction tank 11 includes, in an inside thereof: in the central portion thereof in a vertical direction, a humidifying liquid contact chamber 14 communicating with the introduction port 12 for a gas to be treated; below the humidifying liquid contact chamber 14, an alkaline agent-containing liquid chamber 16 for accommodating an alkaline agent-containing liquid 15 in a lower portion thereof, the alkaline agent-containing liquid chamber 16 communicating with the humidifying liquid contact chamber 14; and above the humidifying liquid contact chamber 14, a discharge chamber 17 for a gas to be treated communicating with the alkaline agent-containing liquid chamber 16 and the discharge port 13 for a gas to be treated. The humidifying liquid contact chamber 14 and the alkaline agent-containing liquid chamber 16 are partitioned with a first partition wall 18 traversing the reaction tank 11, and the humidifying liquid contact chamber 14 and the discharge chamber 17 for a gas to be treated are partitioned with a second partition wall 19 traversing the reaction tank 11.

Moreover, the humidifying liquid contact chamber 14 and the alkaline agent-containing liquid chamber 16 communicate with each other through a plurality of gas descending pipes 22 each arranged so as to extend downward from the first partition wall 18 and reach below a liquid level 21 of the alkaline agent-containing liquid 15 and a plurality of first liquid descending pipes 23 and a plurality of second liquid descending pipes 24 each arranged so as to extend downward from the first partition wall 18 and reach below the liquid level 21 of the alkaline agent-containing liquid 15 and below the lower ends of the gas descending pipes 22. The distances of the lower ends of the gas descending pipe 22, the first liquid descending pipe 23, and the second liquid descending pipe 24 from the liquid level 21 are not particularly limited, but for example, the distance of the lower end of the gas descending pipe 22 from the liquid level 21 is from 0.1 m to 0.7 m, and the distances of the lower ends of the first liquid descending pipe 23 and the second liquid descending pipe 24 from the liquid level 21 are from 0.4 m to 1.0 m. In addition, the length of each descending pipe is not particularly limited, but for example, the length of the gas descending pipe 22 is from 2.5 m to 3.5 m, and the lengths of the first liquid descending pipe 23 and the second liquid descending pipe 24 are from 2.8 m to 3.8 m.

Figure 2A:
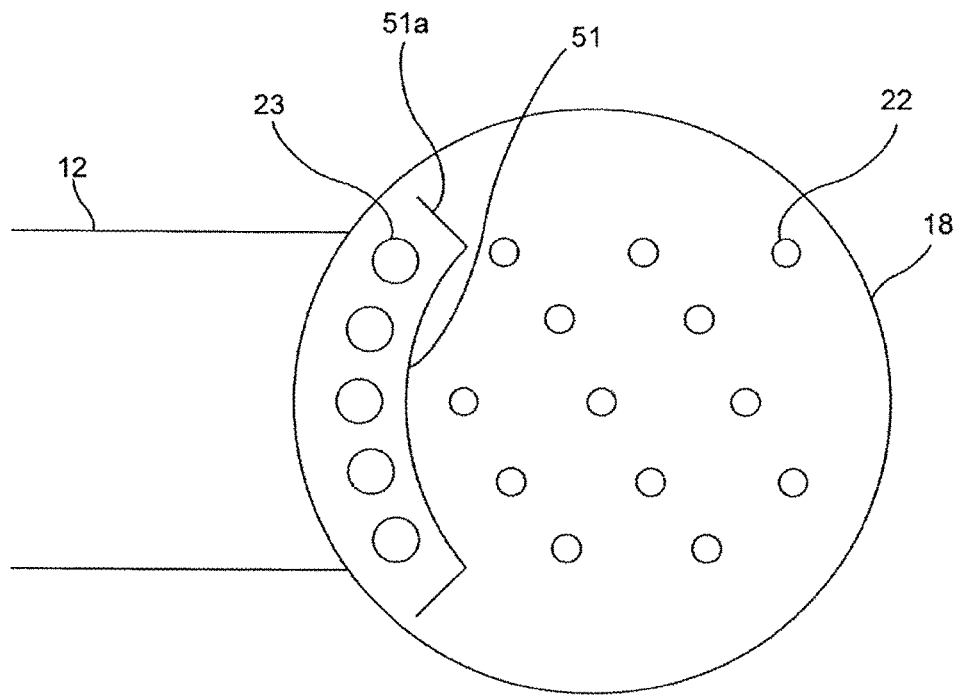
FIG. 2A is an enlarged view of a main portion of FIG. 1 and is a top view.
Figure 2B:
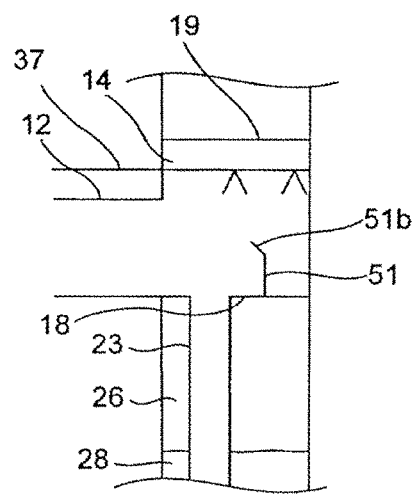
FIG. 2B is an enlarged view of the main portion of FIG. 1 and is a side view.

The plurality of gas descending pipes 22, the plurality of first liquid descending pipes 23, and the plurality of second liquid descending pipes 24 are arranged so that their upper ends are almost equally positioned in the first partition wall 18. The gas descending pipe 22 includes, in a lower portion thereof, a plurality of small openings so that the gas to be treated (third gas) ejected from the gas descending pipe 22 is dispersed in the alkaline agent-containing liquid 15. In addition, as illustrated in FIG. 2A and FIG. 2B, the plurality of first liquid descending pipes 23 are arranged in the first partition wall 18 in the vicinity of a joint portion between the introduction port 12 for a gas to be treated and the humidifying liquid contact chamber 14 and along the edge of the first partition wall 18 at equal intervals. FIG. 2 are enlarged views of a main portion of FIG. 1. FIG. 2A and FIG. 2B are a top view and a side view of the first partition wall 18, respectively. It should be noted that the description of the second liquid descending pipe 24 is omitted. There is no particular limitation on the shapes and sizes of the gas descending pipe 22, the first liquid descending pipe 23, and the second liquid descending pipe 24, but in the case where the gas descending pipe 22, the first liquid descending pipe 23, and the second liquid descending pipe 24 have cylindrical shapes, for example, the diameter of the gas descending pipe 22 is from 0.1 m to 0.2 m, the diameter of the first liquid descending pipe 23 is from 0.5 m to 0.7 m, and the diameter of the second liquid descending pipe 24 is from 0.5 m to 0.7 m.

In order to encourage the humidifying liquid to flow into the first liquid descending pipe 23 and prevent the humidifying liquid from flowing into the gas descending pipe 22, a weir plate for blocking a flow of a liquid may be arranged on the first partition wall 18 on a back side of the first liquid descending pipe 23. The weir plate is further described with reference to FIG. 2A and FIG. 2B. As illustrated in FIG. 2A and FIG. 2B, a weir plate 51 for blocking a flow of a liquid is arranged on a back side of the plurality of first liquid descending pipes 23 seen from a flow of the gas to be treated, the first liquid descending pipes 23 each having an opening on the first partition wall 18. Moreover, in order to allow the humidifying liquid to flow into the first liquid descending pipe 23 easily, the weir plate 51 includes, on both ends thereof in planar view, bent portions 51a each bending toward the side of the introduction port 12 for a gas to be treated, and on an upper portion thereof, an inclined portion 51b inclined by about 45 degrees toward the side of the introduction port 12 for a gas to be treated.

While a second gas is generated when the first gas is brought into contact with the humidifying liquid, the humidifying liquid separated from the second gas flows into the first liquid descending pipe 23, and the third gas obtained by separating the humidifying liquid from the second gas flows into the gas descending pipe 22. The humidifying liquid refers to a liquid capable of humidifying the gas to be treated (first gas), which is the gas containing sulfur oxide, and thus suppressing generation of scale (a precipitate generated in an apparatus or in a pipe owing to, for example, concentration of components of the gas to be treated) due to dryness.

Humidifying liquid separation device for separating the humidifying liquid from the gas to be treated (second gas) through spontaneous precipitation separation is constituted by the humidifying liquid contact chamber 14, the first partition wall 18, the gas descending pipe 22, and the first liquid descending pipe 23.

A space portion 26, which is a space in the alkaline agent-containing liquid chamber 16 above the liquid level, communicates with the discharge chamber 17 for a gas to be treated trough a communicating pipe 25 passing through the central portion of the humidifying liquid contact chamber 14 in a horizontal direction.

Illustrated in FIG. 1 is the apparatus having arranged therein the plurality of gas descending pipes 22, the plurality of first liquid descending pipes 23, the plurality of second liquid descending pipes 24, and the plurality of communicating pipes 25, but the number of each pipe may be one. The second liquid descending pipe 24 may be eliminated. The discharge chamber 17 for a gas to be treated and the communicating pipe 25 may be omitted by arranging the discharge port 13 for a gas to be treated so as to communicate with the space portion 26 so that the space portion 26 doubles as the discharge chamber 17 for a gas to be treated.

A stirrer 27 configured to stir the alkaline agent-containing liquid 15 is arranged in the alkaline agent-containing liquid chamber 16.

An industrial water supply pipe 32 for spraying industrial waste water serving as the humidifying liquid to the gas to be treated through a pipe 31 is arranged in the introduction port 12 for a gas to be treated. The pipe 31 and the industrial water supply pipe 32 may not be arranged.

In addition, a pump 34 configured to extract the alkaline agent-containing liquid 15 through a pipe 33 is arranged at a lower portion of a side surface of the alkaline agent-containing liquid chamber 16 in the reaction tank 11. Moreover, a first humidifying liquid supply pipe 36 for supplying the extracted alkaline agent-containing liquid 15 to the gas to be treated (first gas) through a pipe 35 connected to the pump 34 on an outlet side is arranged in the introduction port 12 for a gas to be treated. In addition, a second humidifying liquid supply pipe 37 for supplying, as the humidifying liquid, the extracted alkaline agent-containing liquid 15 to the gas to be treated (first gas) through the pipe 35 connected to the pump 34 on the outlet side is arranged in the humidifying liquid contact chamber 14. Any one of the first humidifying liquid supply pipe 36 and the second humidifying liquid supply pipe 37 may be arranged. Humidifying liquid contact device is constituted by at least one of the first humidifying liquid supply pipe 36 or the second humidifying liquid supply pipe 37, and the industrial water supply pipe 32 arranged as required. In addition, circulation device is constituted by the pipe 33, the pump 34, the pipe 35, the first humidifying liquid supply pipe 36, and the second humidifying liquid supply pipe 37.

In addition, an oxygen supply pipe 38 for supplying oxygen from an oxygen supply source (not shown) so that oxygen is brought into contact with the gas to be treated (third gas) supplied from the gas descending pipe 22 into the alkaline agent-containing liquid chamber 16 is arranged in the vicinity of a bottom portion of the alkaline agent-containing liquid chamber 16 in the reaction tank 11. The oxygen supply pipe 38 only needs to be able to supply a gas containing oxygen, and for example, may supply air. Sulfur oxide removal device is constituted by the alkaline agent-containing liquid chamber 16 in which the alkaline agent-containing liquid 15 is accommodated, the gas descending pipe 22, and the oxygen supply pipe 38.

In order to extract the humidifying liquid having descended through the first liquid descending pipe 23, a pipe 42 connected to a pump 41 is arranged in the vicinity of the lower end of the first liquid descending pipe 23 and below the liquid level 21 of the alkaline agent-containing liquid 15. The plurality of first liquid descending pipes 23 are connected to each other in the vicinity of their lower ends with a connecting pipe (not shown) in a horizontal direction, and one end of the pipe 42 is inserted in the connecting pipe. Such configuration provides a structure in which the humidifying liquid having descended through the first liquid descending pipe 23 can be extracted through driving of the pump 41. Humidifying liquid acquisition device is constituted by the first liquid descending pipe 23, the pump 41, and the pipe 42.

Moreover, an air separator 61 configured to remove a gas, such as air, in the extracted humidifying liquid is arranged in the course of the pipe 42 for extracting the humidifying liquid having descended through the first liquid descending pipe 23 in the outside of the reaction tank 11. Gas removal device is constituted by the air separator 61. The gas removal device is not limited to the air separator 61, and only needs to be able to remove the gas, such as air, in the extracted humidifying liquid.

In a stage subsequent to the pump 41, there is arranged solid-liquid separation device 44 for subjecting the humidifying liquid having passed through a pipe 43 connected to the pump 41 on an outlet side to solid-liquid separation to recover a by-product generated through a reaction among sulfur oxide, oxygen, and the alkaline agent-containing liquid. By-product recovery device is constituted by the solid-liquid separation device 44.

In a stage subsequent to the solid-liquid separation device 44, there is connected a waste water treatment apparatus configured to remove a nitrogen compound, a CCD component, and the like from a liquid obtained through the separation by the solid-liquid separation device 44 through a pipe 45 connected to the solid-liquid separation device 44. In addition, a pipe 47 branched from the pipe 45 is connected to the alkaline agent-containing liquid chamber 16 in the reaction tank 11. In order to allow reutilization of the liquid obtained through the solid-liquid separation as the alkaline agent-containing liquid, alkaline agent introduction device 48 for introducing an alkaline agent, such as limestone, is arranged in the course of the pipe 47.

As described above, in the present invention, a step of recovering the by-product, such as gypsum, generated through the reaction among sulfur oxide, oxygen, and the alkaline agent-containing liquid is performed only on the humidifying liquid extracted from the first liquid descending pipe 23, while the details are described below. That is, the by-product is recovered through only one path, and hence the apparatus achieves a simple configuration. Moreover, the air separator 61 enables recovery of the by-product at a high recovery rate despite the fact that the by-product is recovered through only one path. In addition, the apparatus having the simple configuration has such a configuration that the alkaline agent-containing liquid is circulated to be brought into contact with the first gas containing sulfur oxide, and hence can be reduced in the amount of an oxidizing substance (peroxide) in waste water and reduced in a load on the waste water treatment apparatus. In addition, the humidifying liquid in the first liquid descending pipe 23, which has been brought into contact with the gas containing sulfur oxide, has a low pH and hence allows easy dissolution of the alkaline agent. As a result, a by-product having a high purity in which mixing of the alkaline agent is suppressed can be obtained.

The desulfurization method for a gas containing sulfur oxide of the present invention using the desulfurization apparatus 10 as described above is described. First, the first gas containing a sulfur compound, which is the gas to be treated, is introduced into the reaction tank 11 through the introduction port 12 for a gas to be treated. The first gas introduced from the introduction port 12 for a gas to be treated is brought into contact with industrial water sprayed from the industrial water supply pipe 32, and the alkaline agent-containing liquid sprayed from the first humidifying liquid supply pipe 36 in the stated order, and then is brought into contact with the alkaline agent-containing liquid sprayed from the second humidifying liquid supply pipe 37 (humidifying liquid contact step). In the first embodiment, the industrial water and the alkaline agent-containing liquid serve as the humidifying liquid. When the first gas is brought into contact with the industrial water and the alkaline agent-containing liquid, the first gas is humidified, and generation of scale in the apparatus due to dryness can be prevented. In addition, the first gas can also be cooled and dust can be removed therefrom through the spraying of the alkaline agent-containing liquid and the industrial water from the first humidifying liquid supply pipe 36, the second humidifying liquid supply pipe 37, and the industrial water supply pipe 32. When dust is removed from the first gas, fine powder, such as dust, is also removed from the second gas at the time of separation of the humidifying liquid in a subsequent humidifying liquid separation step. Accordingly, inhibition of a reaction among the third gas, oxygen, and the alkaline agent due to the fine powder, such as dust, can be prevented, and the reaction can be performed efficiently. Moreover, also part of sulfur oxide, such as $SO_2$, in the first gas is absorbed by the humidifying liquid. The first gas brought into gas-liquid contact with the humidifying liquid as described above, that is, a mixture of the first gas and the humidifying liquid is the second gas.

Then, the humidifying liquid having absorbed sulfur oxide, such as $SO_2$, in the second gas spontaneously falls on the bottom surface of the humidifying liquid contact chamber 14, that is, on the first partition wall 18. Thus, a liquid, which is the humidifying liquid having absorbed sulfur oxide, such as $SO_2$, and the third gas are separated from each other (humidifying liquid separation step). Most of the humidifying liquid having fallen flows into the first liquid descending pipe 23 arranged in the vicinity of the introduction port 12 for a gas to be treated on an upstream side. In addition, the third gas flows into the gas descending pipe 22 arranged at a position farther away from the introduction port 12 for a gas to be treated than the first liquid descending pipe 23 (downstream side). It should be noted that the humidifying liquid sprayed from the second humidifying liquid supply pipe 37 in a region far away from the side of the introduction port 12 for a gas to be treated descends through the second liquid descending pipe 24 to be accommodated in the alkaline agent-containing liquid chamber 16.

The third gas having flowed into the gas descending pipe 22 reaches the alkaline agent-containing liquid chamber 16 and is elected from the lower end of the gas descending pipe 22 below the liquid level 21 of the alkaline agent-containing liquid 15 accommodated in the alkaline agent-containing liquid chamber 16 to be dispersed in the alkaline agent-containing liquid 15, and then rises therein in gas-liquid contact with the alkaline agent-containing liquid while causing bubbling. Then, a jet bubbling layer (froth layer) 28, which is a gas-liquid contact layer of a liquid continuous layer containing the third gas and the alkaline agent-containing liquid, is formed on the liquid level 21 of the alkaline agent-containing liquid. The alkaline agent-containing liquid 15 has mixed therein oxygen supplied from the oxygen supply pipe 38, and hence sulfur oxide in the third gas, oxygen, and the alkaline agent react with each other in the jet bubbling layer 28 (sulfur oxide removal step). With this, sulfur oxide, such as $SO_2$, is removed from the third gas.

The alkaline agent in the alkaline agent-containing liquid refers to a neutralizing agent for neutralizing an acid, and examples thereof include calcium carbonate and sodium hydroxide. In addition, as a solvent in the alkaline agent-containing liquid, water is given.

Herein, scale is generated through the reaction among sulfur oxide, oxygen, and the alkaline agent owing to dryness in some cases, but in the present invention, the generation of the scale is suppressed because the method of the present invention includes, in a stage prior to the reaction among sulfur oxide, oxygen, and the alkali, the humidifying liquid contact step of bringing the first gas, which is the gas to be treated, into contact with the humidifying liquid.

In a sulfur oxide removal reaction to be caused in the sulfur oxide removal step, sulfur oxide, such as $SO_2$, in the third gas reacts with the alkaline agent and oxygen to generate solid matter, such as gypsum, which is the by-product. Thus, sulfur oxide is removed from the third gas. For example, in the case where sulfur oxide includes $SO_2$ and limestone ($CaCO_3$) is used as the alkaline agent, a reaction represented by the following formula (1) occurs, and gypsum ($CaSO_4.2H_2O$), which is the by-product, is generated and can be separated from the third gas.

$$SO_2 + 2H_2O + \tfrac{1}{2}O_2 + CaCO_3 \rightarrow CaSO_4.2H_2O + CO_2 \quad (1)$$

The third gas from which sulfur oxide has been removed through the sulfur oxide removal reaction is discharged from the discharge port 13 for a gas to be treated through the space portion 26 in an upper portion of the alkaline agent-containing liquid chamber 16, the communicating pipe 25, and the discharge chamber 17 for a gas to be treated.

On the other hand, the alkaline agent-containing liquid 15 containing the generated by-product at a high concentration is extracted from a lower portion of the alkaline agent-containing liquid chamber 16 with the pump 34 through the pipe 33. The extracted alkaline agent-containing liquid is sprayed to the first gas from the first humidifying liquid supply pipe 36 and the second humidifying liquid supply pipe 37 through the pipe 35 (circulation step). That is, the alkaline agent-containing liquid after the circulation step serves as the humidifying liquid for the first gas. When the first gas is brought into contact with the alkaline agent-containing liquid serving as the humidifying liquid after the circulation step, the first gas is humidified to become the second gas (humidifying liquid contact step). In addition, part of sulfur oxide, such as $SO_2$, in the first gas is absorbed by the alkaline agent-containing liquid after the circulation step.

The alkaline agent-containing liquid serving as the humidifying liquid after the circulation step having absorbed sulfur oxide, such as $SO_2$, in the second gas spontaneously falls on the bottom surface of the humidifying liquid contact chamber 14, that is, on the first partition wall 18. Thus, the alkaline agent-containing liquid serving as the humidifying liquid having absorbed sulfur oxide, such as $SO_2$, and the third gas are separated from each other (humidifying liquid separation step). Most of the alkaline agent-containing liquid serving as the humidifying liquid having fallen flows into the first liquid descending pipe 23, and the third gas flows into the gas descending pipe 22. The third gas having flowed into the gas descending pipe 22 is brought into contact with the alkaline agent-containing liquid 15 and oxygen, and is again subjected to the sulfur oxide removal reaction.

On the other hand, at least part of the alkaline agent-containing liquid serving as the humidifying liquid having flowed into the first liquid descending pipe 23 is extracted from the pipe 42 connected to the pump 41 (humidifying liquid acquisition step).

Herein, the alkaline agent-containing liquid serving as the humidifying liquid having flowed into the first liquid descending pipe 23 is derived from the alkaline agent-containing liquid accommodated in the alkaline agent-containing liquid chamber 16, and hence contains the alkaline agent and the by-product generated through the sulfur oxide removal reaction.

In addition, when an oxidation reaction excessively proceeds in the sulfur oxide removal reaction occurring in the alkaline agent-containing liquid chamber 16, a peroxide, such as $S_2O_8^{2-}$, which is the oxidizing substance, is generated, and hence the alkaline agent-containing liquid having been circulated and then flowed into the first liquid descending pipe 23 contains the oxidizing substance. The oxidizing substance leads to deterioration of the waste water treatment apparatus in a subsequent stage. For example, the oxidizing substance results in deterioration of an adsorbent for waste water treatment or a resin to be used as an ion exchanger, or inhibition of growth of microorganisms to be used for the waste water treatment.

However, in this embodiment, the alkaline agent-containing liquid having flowed into the first liquid descending pipe 23 is not brought into contact with oxygen after its contact with the first gas in the humidifying liquid contact step, and contains sulfur oxide, such as $SO_2$, in the first gas, which has been contained therein in the humidifying liquid contact step, with the state of sulfur oxide, such as $SO_2$, kept without a reaction.

Accordingly, in the present invention, a reaction of reducing the oxidizing substance with sulfur oxide, such as $SO_2$, serving as a reducing agent, for example, a reaction represented by the following formula (2) occurs. As a result, deterioration of the waste water treatment apparatus caused by the oxidizing substance can be suppressed.

$$H_2S_2O_8 + H_2SO_3 + H_2O \rightarrow 3H_2SO_4 \quad (2)$$

A gas, such as air, is removed from the alkaline agent-containing liquid serving as the humidifying liquid extracted in the humidifying liquid acquisition step, with the air separator 61 arranged in the course of the pipe 42 (gas removal step). Needless to say, the entire amount of the gas, such as air, in the humidifying liquid may not be completely removed, and it is appropriate to reduce the amount of the gas in the humidifying liquid. The by-product generated through the sulfur oxide removal reaction, which is the reaction among sulfur oxide, oxygen, and the alkaline agent-containing liquid, is recovered from the humidifying liquid from which the gas has been removed with the air separator 61 and which has passed through the pump 41 by the solid-liquid separation device 44 (by-product recovery step). The humidifying liquid in the first liquid descending pipe 23, which has been brought into contact with the first gas containing sulfur oxide, has a low pH and hence allows easy dissolution of the alkaline agent, such as calcium carbonate. As a result, mixing of the residual alkaline agent in the by-product generated through the sulfur oxide removal reaction is suppressed, and the humidifying liquid in the first liquid descending pipe 23 contains a by-product having a high purity. The humidifying liquid containing the by-product having a high purity as described above is subjected to solid-liquid separation, and hence the by-product, such as gypsum, recovered by the solid-liquid separation device 44 has a high purity.

Sulfur oxide amount measurement device for measuring the residual amount of sulfur oxide, such as $SO_2$, may be arranged downstream of the humidifying liquid acquisition device and upstream of the solid-liquid separation device 44, and the reaction conditions of the sulfur oxide removal reaction in the reaction tank 11 may be feedback controlled depending on the amount of sulfur oxide measured. The feedback control may be performed automatically or manually.

A liquid obtained through the separation by the solid-liquid separation device 44 is fed to the waste water treatment apparatus, and subjected to waste water treatment for removing a nitrogen compound, a COD, and the like (waste water treatment step). As described above, the oxidizing substance is removed from waste water to be subjected to the waste water treatment, and hence deterioration of the waste water treatment apparatus is suppressed.

In addition, part of the liquid obtained by the solid-liquid separation device 44 passes through the pipe 47 branched from the pipe 45, has the alkaline agent, such as limestone, introduced therein by the alkaline agent introduction device 48 arranged in the course of the pipe 47, is fed to the alkaline agent-containing liquid chamber 16 in the reaction tank 11, and is reutilized as the alkaline agent-containing liquid for the sulfur oxide removal reaction.

Figure 7:
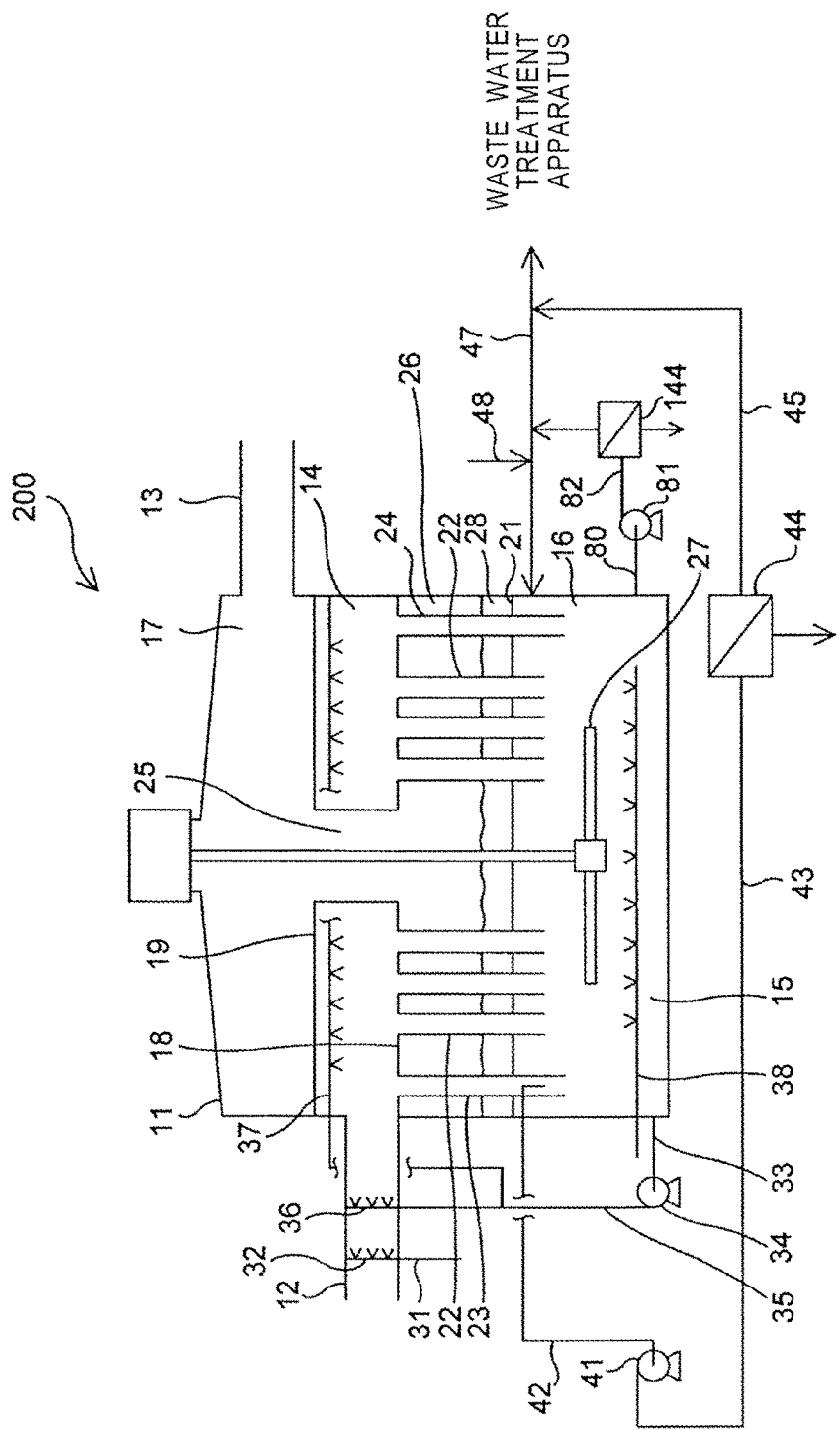
FIG. 7 is a schematic view for illustrating an example of a jet bubbling-type desulfurization apparatus used in Comparative Example 1.

In the present invention, the step of recovering the by-product, such as gypsum, generated through the sulfur oxide removal reaction, which is the reaction among sulfur oxide, oxygen, and the alkaline agent-containing liquid, is not performed on the alkaline agent-containing liquid immediately after the sulfur oxide removal reaction. In other words, in the present invention, the following operation as illustrated in FIG. 7 is not performed: the alkaline agent-containing liquid 15 is extracted from the alkaline agent-containing liquid chamber 16, and the by-product is recovered from the extracted alkaline agent-containing liquid 15 by solid-liquid separation device 144. That is, after the gas to be treated is subjected to the sulfur oxide removal reaction in the alkaline agent-containing liquid chamber 16, the step of recovering the by-product is performed only on the alkaline agent-containing liquid subjected to the circulation step, the humidifying liquid contact step, the humidifying liquid separation step, the humidifying liquid acquisition step, and the gas removal step. Accordingly, the by-product is recovered through only one kind of path in which, after the gas to be treated is subjected to the sulfur oxide removal reaction in the alkaline agent-containing liquid chamber 16, the circulation step, the humidifying liquid contact step, the humidifying liquid separation step, the humidifying liquid acquisition step, the gas removal step, and the by-product recovery step are performed in the stated order. As a result, a simple configuration is achieved. It should be noted that only the number of kinds of the path for recovering the by-product needs to be one, and the number of paths for removing the gas and then recovering the by-product from the "alkaline agent-containing liquid subjected to the circulation step, the humidifying liquid contact step, the humidifying liquid separation step, and the humidifying liquid acquisition step in the stated order after the gas to be treated is subjected to the sulfur oxide removal reaction in the alkaline agent-containing liquid chamber 16" may be two or more. Specifically, for example, the humidifying liquid extracted from the first liquid descending pipe 23 may be divided into two or more lines, and the humidifying liquids in the two or more lines may each be subjected to the gas removal step and the by-product recovery step.

Herein, the second gas flows into the first liquid descending pipe 23 together with the humidifying liquid, and hence the humidifying liquid extracted from the first liquid descending pipe 23 with the pump 41 through the pipe 42 contains the gas. Therefore, if the air separator 61 is not arranged, there is a risk in that the operation of the pump 41 is prevented by the gas in the humidifying liquid. As a result, the humidifying liquid cannot be fed to the solid-liquid separation device 44 with the pump 41 efficiently, resulting in a low recovery rate of the by-product from the humidifying liquid by the solid-liquid separation device 44. In order to recover the by-product in a large amount, it is necessary to extract the alkaline agent-containing liquid 15 from the alkaline agent-containing liquid chamber 16, and recover the by-product from the extracted alkaline agent-containing liquid 15 by the additional solid-liquid separation device 144 (FIG. 7).

In contrast, according to the present invention, the humidifying liquid extracted from the first liquid descending pipe 23 through the pipe 42 passes through the air separator 61 and then flows into the pump 41, and hence the gas can be removed from the humidifying liquid with the air separator 61 before the humidifying liquid reaches the pump 41. As a result, the operation of the pump 41 is not prevented by the gas in the humidifying liquid, the humidifying liquid can be fed to the solid-liquid separation device 44 with the pump 41 efficiently, and the recovery rate of the by-product from the humidifying liquid by the solid-liquid separation device 44 can be increased. Therefore, in the present invention, it is not necessary to recover the by-product from the alkaline agent-containing liquid 15 extracted from the alkaline agent-containing liquid chamber 16, which eliminates the need for the additional solid-liquid separation device 144 for recovering the by-product from the alkaline agent-containing liquid 15, and can simplify the desulfurization apparatus.

As described above, according to the present invention, a load on the waste water treatment apparatus can be reduced, and the purity and recovery rate of the by-product can be increased. Further, the by-product, such as gypsum, generated through the sulfur oxide removal reaction is recovered through only one kind of path, and hence a simple configuration is achieved.

Illustrated in FIG. 1 is a so-called soot-type desulfurization apparatus in which cooling can be performed simultaneously. However, the desulfurization apparatus of the present invention is not limited to the soot type, and cooling may be performed in a separate tower.

Figure 3:
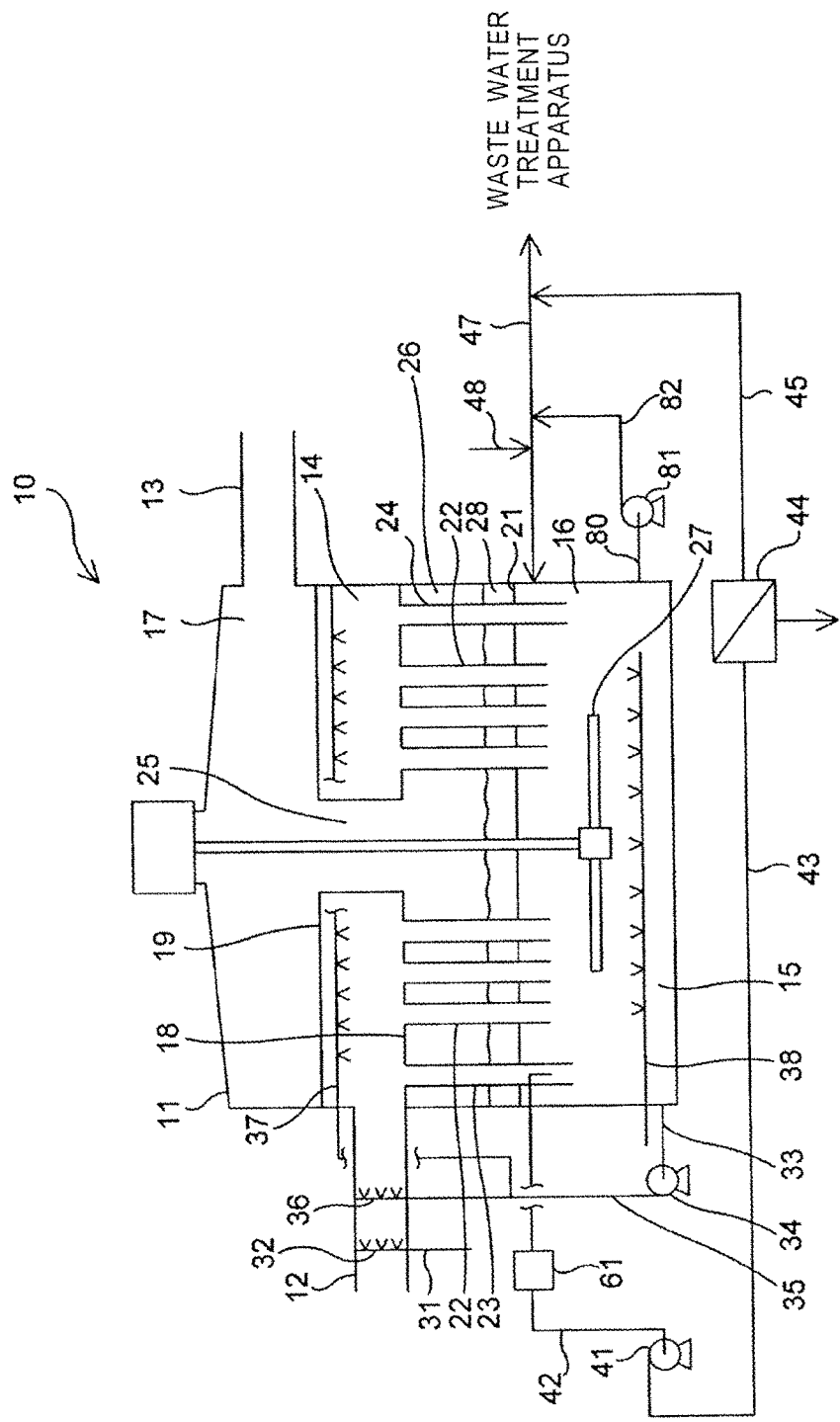
FIG. 3 is a schematic view for illustrating another example of the jet bubbling-type desulfurization apparatus to which the desulfurization method for a gas containing sulfur oxide of the present invention can be applied.

In addition, as illustrated in FIG. 3, the alkaline agent-containing liquid may be extracted from the vicinity of the bottom portion of the alkaline agent-containing liquid chamber 16 in the reaction tank 11 with a pump 81 through a pipe 80, and a pipe 82 connected to the pump 81 on an outlet side may be connected to the pipe 47. With this, the properties of the alkaline agent-containing liquid can be adjusted in detail.

Second Embodiment

Figure 4:
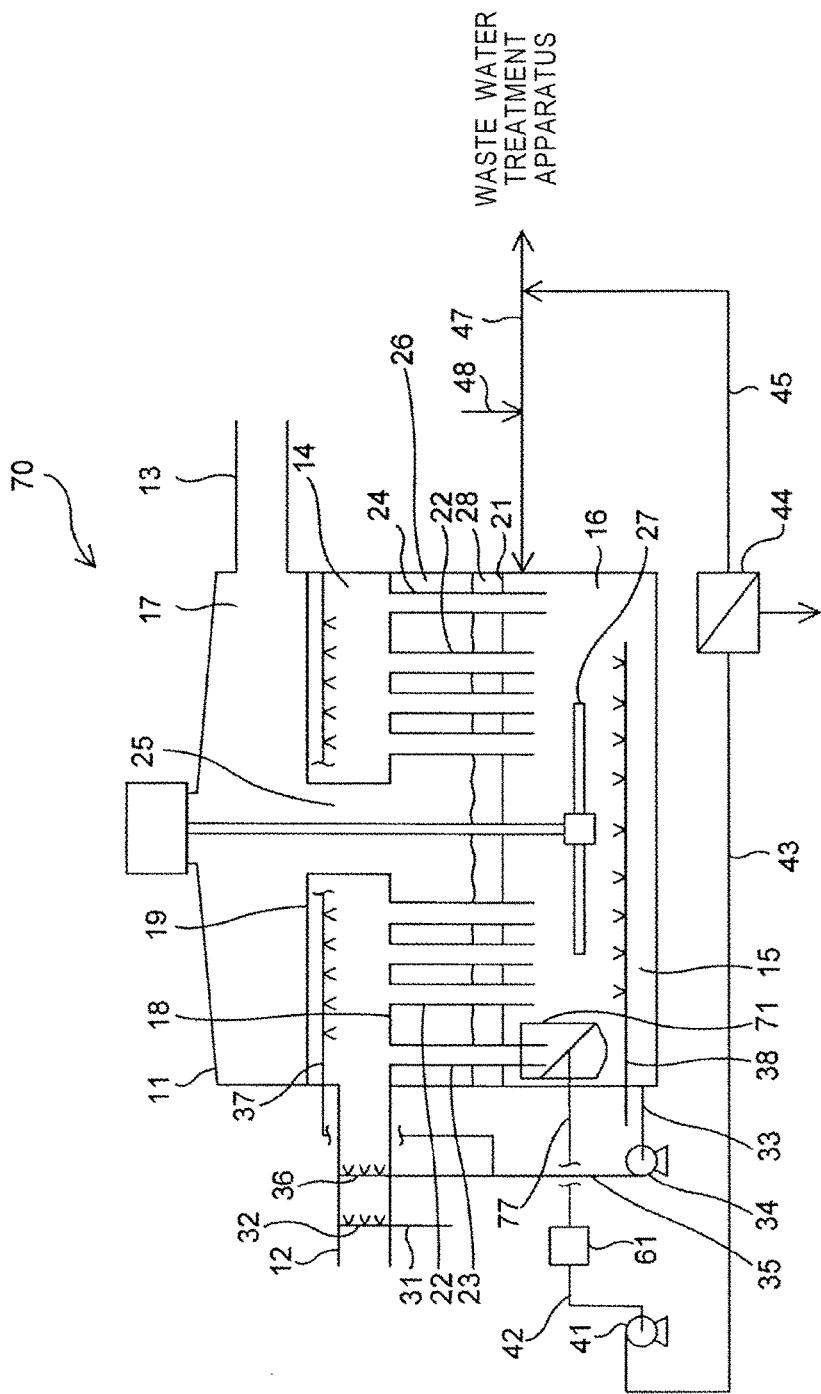
FIG. 4 is a schematic view for illustrating still another example of the jet bubbling-type desulfurization apparatus to which the desulfurization method for a gas containing sulfur oxide of the present invention can be applied.

FIG. 4 is a schematic view for illustrating a jet bubbling-type desulfurization apparatus according to a second embodiment of the present invention. It should be noted that the same members as in the first embodiment are donated by the same reference signs, and the overlapping description is omitted. As illustrated in FIG. 4, a desulfurization apparatus 70 is a desulfurization apparatus obtained by arranging a pot 71 at the lower end of the first liquid descending pipe 23 in the desulfurization apparatus 60 of the first embodiment.

Specifically, as illustrated in FIG. 4, the desulfurization apparatus 70 includes the semi-closed pot 71 surrounding a lower end portion of the first liquid descending pipe 23. The pot 71 is arranged with its upper end below the liquid level 21 in the alkaline agent-containing liquid chamber 16 and near the height of a gas outlet of the gas descending pipe 22, and with its lower end below the first liquid descending pipe 23. The upper end of the pot 71 may be above or below the liquid level 21. The upper surface of the pot 71 is located, for example, from about 0.1 m to about 0.7 m below the liquid level 21, and the lower end of the pot 71 is located, for example, from about 2.0 m to about 2.5 m below the liquid level 21.

The pot 71 is described in more detail with reference to FIG. 5, which is a sectional view for illustrating a schematic configuration of the pot 71. The pot 71 has a cylindrical shape, and includes: a side wall 72; and a doughnut-shaped bottom plate 73 having a hole in its central portion, the bottom plate 73 being tilted downward from the lower end of the side wall 72 toward the central portion. The pot 71 is configured so that oxygen to be supplied from the oxygen supply pipe 38 into the reaction tank 11 is prevented from entering the pot 71. The bottom plate 73 may not be formed when oxygen to be supplied from the oxygen supply pipe 38 into the reaction tank 11 can be prevented from flowing into the pot by, for example, arranging a discharge port (not shown) for discharging the alkaline agent-containing liquid serving as the humidifying liquid from the pot 71 at a connecting portion between a lower portion of the side wall 72 and a tilted plate 76 described later. In addition, the pot 71 has an open top. The size and shape of the pot 71 are not particularly limited, but for example, in the case of having a cylindrical shape, the pot has a diameter of from about 1.7 m to about 2.3 m and a height of the side wall 72 of from about 1.7 m to about 2.3 m.

Moreover, the pot 71 is arranged so as to surround the lower end of the first liquid descending pipe 23, the lower end of a second oxygen supply pipe 74 (oxygen supply device) for supplying oxygen into the pot 71, and the lower end of a sparger pipe 75 for supplying a gas containing sulfur oxide, such as the third gas. That is, the lower ends of the first liquid descending pipe 23, the second oxygen supply pipe 74, and the sparger pipe 75 are each inserted in the pot 71. For example, the third gas may be used as the gas to be supplied from the sparger pipe 75. When the gas containing sulfur oxide is supplied from the sparger pipe 75, the concentration of sulfur oxide serving as a reducing agent for reducing the oxidizing substance is increased, and thus the reaction represented by the formula (2) can be controlled. Concurrently, the alkaline agent-containing liquid serving as the humidifying liquid and oxygen in the pot 71 can be stirred, and in addition, also the reaction represented by the formula (1) occurring in the pot 71 can be controlled. It should be noted that the sparger pipe 75 may not be arranged.

In addition, the pot 71 includes the tilted plate 76 for partitioning the pot 71 to define a flow of the humidifying liquid having flowed from the first liquid descending pipe 23 into the pot 71, the tilted plate 76 being tilted by about 45 degrees with respect to the vertical direction. A pipe 77 leading to the pump 41 is connected to the tilted plate 76 in its central portion in the vertical direction in order to horizontally extract the humidifying liquid flowing on the tilted plate 76.

The other end of the pipe 77 is connected to the air separator 61 configured to remove a gas, such as air, in the humidifying liquid, and the air separator 61 is connected to the pump 41 through the pipe 42.

In the second embodiment, the humidifying liquid acquisition device is constituted by the first liquid descending pipe 23, the pump 41, the pipe 42, and in addition, the pot 71, the second oxygen supply pipe 74, the sparger pipe 75, and the pipe 77.

The desulfurization method for a gas containing sulfur oxide using the desulfurization apparatus 70 as described above is described. In the second embodiment, steps other than the humidifying liquid acquisition step are the same as those in the first embodiment, and hence the description of the humidifying liquid contact step, the humidifying liquid separation step, the sulfur oxide removal step, the circulation step, the gas removal step, the by-product recovery step, the waste water treatment step, and the like is omitted.

In the second embodiment, the alkaline agent-containing liquid serving as the humidifying liquid having flowed into the first liquid descending pipe 23 is brought into contact with oxygen supplied from the second oxygen supply pipe 74 in the pot 71.

Herein, the alkaline agent-containing liquid having flowed into the first liquid descending pipe 23 contains almost no oxidizing substance, and is somewhat reduced in sulfur oxide, such as $SO_2$, because, as described above, sulfur oxide, such as $SO_2$, and the oxidizing substance react with each other through the reaction represented by the formula (2) or the like. However, a considerable amount of sulfur oxide, such as $SO_2$, remains in some cases. In addition, the alkaline agent-containing liquid having flowed into the first liquid descending pipe 23 is derived from the alkaline agent-containing liquid accommodated in the alkaline agent-containing liquid chamber 16, and hence contains the alkaline agent and the by-product generated through the sulfur oxide removal reaction.

Therefore, in the second embodiment, oxygen newly supplied from the second oxygen supply pipe 74, sulfur oxide, such as $SO_2$, remaining in the alkaline agent-containing liquid, and the alkaline agent in the alkaline agent-containing liquid react with each other to cause, for example, the reaction represented by the formula (1) also in the pot 71. As a result, the humidifying liquid extracted from the pot 71 is remarkably reduced in sulfur oxide, such as $SO_2$, and the oxidizing substance.

More specifically, in the second embodiment, first, a reaction between the oxidizing substance and sulfur oxide represented by the formula (2) or the like occurs in the first liquid descending pipe 23 and in the pot 71 in the same manner as in the first embodiment. This enables a reduction in sulfur oxide, such as $SO_2$, and almost complete elimination of the oxidizing substance. After that, oxygen is introduced from the second oxygen supply pipe 74 into the pot 71, and thus the reaction among sulfur oxide, the alkaline agent, and oxygen represented by the formula (1) or the like occurs. As a result, a further reduction in sulfur oxide, such as $SO_2$, can be achieved, and the purity of the by-product, such as gypsum, can be increased.

The reactions represented by the formulae (1) and (2) occurring in the pot 71 can be controlled by adjusting the amount of oxygen to be supplied from the second oxygen supply pipe 74 or the amount of the gas containing sulfur oxide to be supplied from the sparger pipe 75. Needless to say, any one or both of the amounts may be adjusted to zero depending on the situation.

The humidifying liquid subjected to the reaction between the oxidizing substance and sulfur oxide represented by the formula (2) or the like, and subsequently to the reaction among sulfur oxide, the alkaline agent, and oxygen represented by the formula (1) or the like in the first liquid descending pipe 23 and in the pot 71 flows on the tilted plate 76, and is extracted with the pump 41 through the pipe 77 arranged in the middle of the tilted plate 76. Herein, the humidifying liquid is in a slurry form containing the by-product in a large amount, and the amount of the humidifying liquid itself is also large because the by-product generated through the reaction among sulfur oxide, the alkaline agent, and oxygen represented by the formula (1) or the like is recovered through only one kind of path and further the reaction among sulfur oxide, the alkaline agent, and oxygen represented by the formula (1) or the like is caused also in the pot 71. Therefore, it is preferred to arrange the tilted plate 76 and thus extract the humidifying liquid while suppressing separation in the humidifying liquid. When a slurry (humidifying liquid) is allowed to flow on the tilted plate 76, precipitation of the by-product in the slurry is prevented, and the slurry can be extracted without separation of the by-product.

A gas, such as air, is removed from the humidifying liquid extracted through the pipe 77 with the air separator 61 in the same manner as in the first embodiment, and the humidifying liquid is fed to the pump 41 through the pipe 42.

Figure 5:
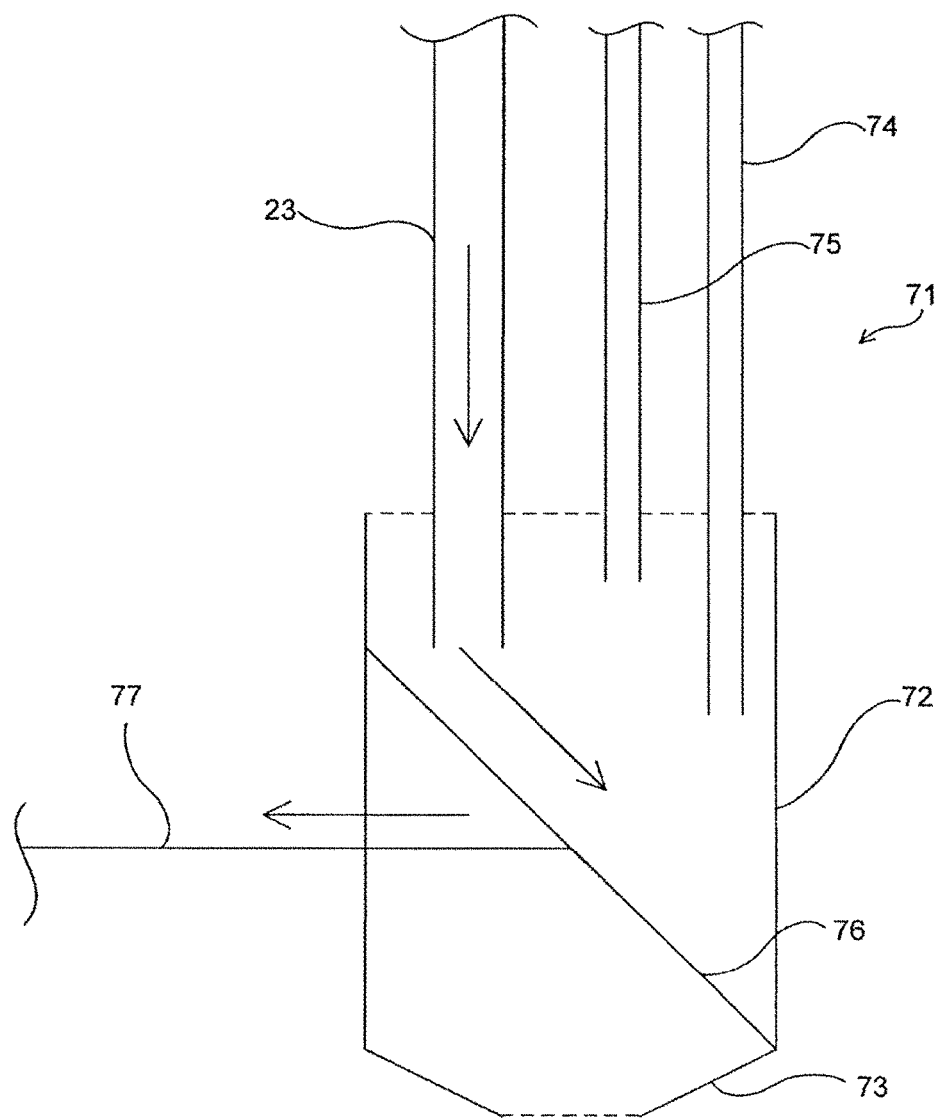
FIG. 5 is a sectional view for illustrating a schematic configuration of a pot.

The desulfurization apparatus illustrated in FIG. 4 and FIG. 5 has a configuration in which all the pot 71, the second oxygen supply pipe 74, and the sparger pipe 75 are added to the desulfurization apparatus of the first embodiment, but may have a configuration in which any one thereof is added to the desulfurization apparatus of the first embodiment.

Third Embodiment

Figure 6:
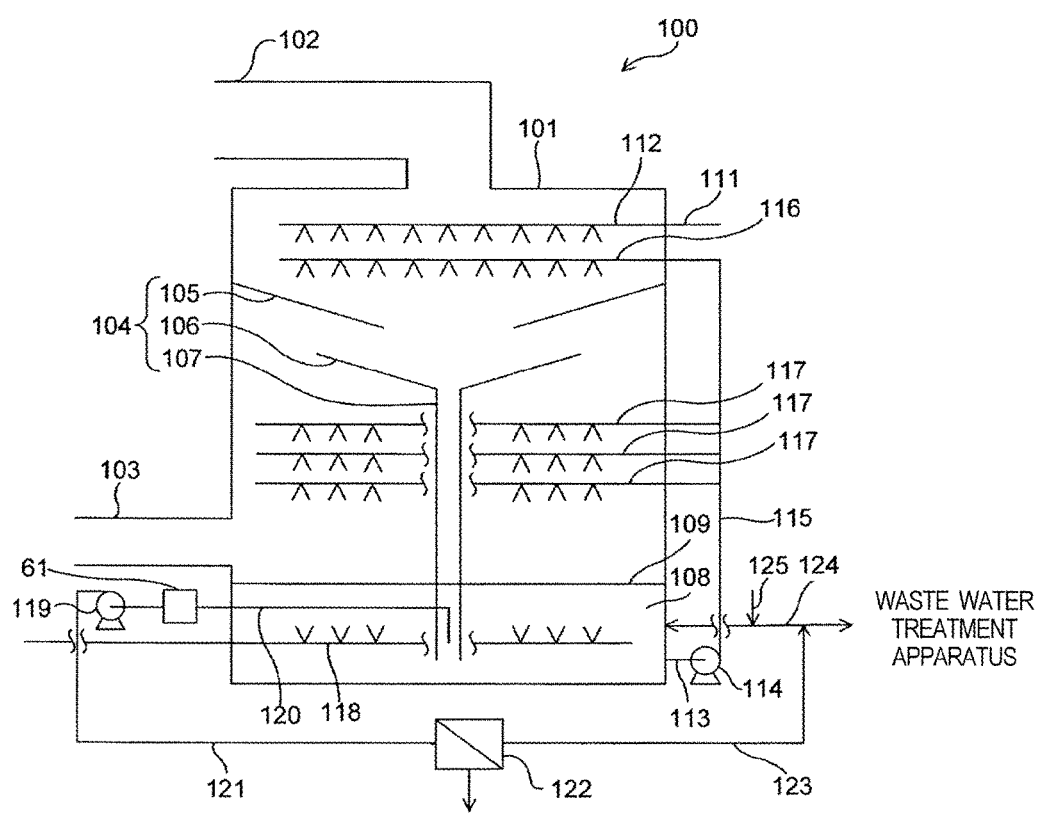
FIG. 6 is a schematic view for illustrating an example of a spray-type desulfurization apparatus to which the desulfurization method for a gas containing sulfur oxide of the present invention can be applied.

FIG. 6 is a schematic view for illustrating a spray-type desulfurization apparatus according to a third embodiment of the present invention. It should be noted that the overlapping description with the first embodiment is omitted.

As illustrated in FIG. 6, a spray-type desulfurization apparatus 100 includes: a cylindrical spray-type reaction tank 101; an introduction port 102 for a gas to be treated for introducing the gas to be treated (first gas) into the reaction tank 101, the introduction port 102 being arranged near the central portion of a ceiling plate of the reaction tank 101; and a discharge port 103 for a gas to be treated for discharging, from the reaction tank 101, the gas to be treated subjected to desulfurization treatment in the reaction tank 101, the discharge port 103 being arranged at a lower portion of a side wall of the reaction tank 101. The introduction port 102 for a gas to be treated and the discharge port 103 for a gas to be treated correspond to the "gas introduction device" and the "gas discharge device" in the claims, respectively.

A cascade-shaped separation plate 104 is arranged in an inside of the reaction tank 101. The separation plate 104 includes: an inclined plate 105 of a doughnut shape inclined downward toward its central portion; a funnel-shaped liquid collector 106 of a doughnut shape having an outer diameter larger than the inner diameter of the inclined plate 105, the funnel-shaped liquid collector 106 being inclined downward toward its central portion; and a liquid descending pipe 107 connected to a hole in the central portion of the funnel-shaped liquid collector 106. The liquid descending pipe 107 is arranged so that its lower end reaches below a liquid level 109 of an alkaline agent-containing liquid 108 accommodated in a lower portion of the reaction tank 101. Illustrated in FIG. 6 is the apparatus including only one separation plate 104, but the apparatus may include a plurality of separation plates 104. The humidifying liquid separation device is constituted by the separation plate 104 including the inclined plate 105, the funnel-shaped liquid collector 106, and the liquid descending pipe 107.

An industrial water supply pipe 112 for spraying industrial waste water serving as the humidifying liquid to the gas to be treated through a pipe 111 is arranged in an upper portion of the reaction tank 101. The pipe 111 and the industrial water supply pipe 112 may not be arranged.

In addition, a pump 114 configured to extract the alkaline agent-containing liquid 108 through a pipe 113 is arranged at a lower portion of a side surface of the reaction tank 101. In addition, a humidifying liquid supply pipe 116 for supplying the extracted alkaline agent-containing liquid 108 to the gas to be treated (first gas) through a pipe 115 connected to the pump 114 on an outlet side is arranged below the industrial water supply pipe 112 and above the separation plate 104 in the reaction tank 101. The number of industrial water supply pipes 112 and the number of humidifying liquid supply pipes 116 are not particularly limited. The humidifying liquid contact device is constituted by the humidifying liquid supply pipe 116, and the industrial water supply pipe 112 arranged as required. In addition, the circulation device is constituted by the pipe 113, the pump 114, the pipe 115, and the humidifying liquid supply pipe 116.

In addition, three alkaline agent-containing liquid supply pipes 117 for supplying the extracted alkaline agent-containing liquid 108 to the gas to be treated (third gas) through the pipe 115 connected to the pump 114 on the outlet side are arranged below the funnel-shaped liquid collector 106 and above the liquid level 109 of the alkaline agent-containing liquid 108 in the reaction tank 101. In FIG. 6, the three alkaline agent-containing liquid supply pipes 117 are arranged, but the number of alkaline agent-containing liquid supply pipes 117 is not particularly limited.

An oxygen supply pipe 118 for supplying oxygen from an oxygen supply source (not shown) so that oxygen is brought into contact with the gas to be treated (third gas) brought into contact with the alkaline agent-containing liquid supplied from the alkaline agent-containing liquid supply pipe 117 is arranged in the vicinity of a bottom portion of the reaction tank 101. The oxygen supply pipe 118 only needs to be able to supply a gas containing oxygen, and for example, may supply air. The sulfur oxide removal device is constituted by the reaction tank 101 in which the alkaline agent-containing liquid 108 is accommodated, the alkaline agent-containing liquid supply pipe 117, and the oxygen supply pipe 118.

In order to extract the humidifying liquid having descended through the liquid descending pipe 107, a pipe 120 connected to a pump 119 is arranged in the vicinity of the lower end of the liquid descending pipe 107 and below the liquid level 109 of the alkaline agent-containing liquid 108. The humidifying liquid acquisition device is constituted by the liquid descending pipe 107, the pump 119, and the pipe 120.

Moreover, the air separator 61 configured to remove a gas, such as air, in the humidifying liquid is arranged in the course of the pipe 120 for extracting the humidifying liquid having descended through the liquid descending pipe 107 in the outside of the reaction tank 101.

In a stage subsequent to the pump 119, there is arranged solid-liquid separation device 122 for subjecting the humidifying liquid having passed through a pipe 121 connected to the pump 119 on an outlet side to solid-liquid separation to remove the by-product generated through the reaction among sulfur oxide, oxygen, and the alkaline agent-containing liquid. The by-product recovery device is constituted by the solid-liquid separation device 122.

In a stage subsequent to the solid-liquid separation device 122, there is connected the waste water treatment apparatus configured to remove a nitrogen compound and a CCD from a liquid obtained through the separation by the solid-liquid separation device 122 through a pipe 123 connected to the solid-liquid separation device 122. In addition, a pipe 124 branched from the pipe 123 is connected to the reaction tank 101. In order to allow reutilization of the liquid obtained through the solid-liquid separation as the alkaline agent-containing liquid, alkaline agent introduction device 125 for introducing the alkaline agent, such as limestone, is arranged in the course of the pipe 124.

As described above, in the present invention, the step of recovering the by-product, such as gypsum, generated through the reaction among sulfur oxide, oxygen, and the alkaline agent-containing liquid is performed only on the humidifying liquid extracted from the liquid descending pipe 107. That is, the by-product is recovered through only one path, and hence the apparatus achieves a simple configuration. Moreover, the air separator 61 enables recovery of the by-product at a high recovery rate despite the fact that the by-product is recovered through only one path. In addition, the apparatus having the simple configuration has such a configuration that the alkaline agent-containing liquid is circulated to be brought into contact with the first gas containing sulfur oxide, and hence can be reduced in the amount of the oxidizing substance (peroxide) in waste water and reduced in a load on the waste water treatment apparatus. In addition, the humidifying liquid in the liquid descending pipe 107, which has been brought into contact with the gas containing sulfur oxide, has a low pH and hence allows easy dissolution of the alkaline agent. As a result, a by-product having a high purity in which mixing of the alkaline agent is suppressed can be obtained.

The desulfurization method for a gas containing sulfur oxide of the present invention using the desulfurization apparatus 100 as described above is described. First, the first gas containing a sulfur compound, which is the gas to be treated, is introduced from the introduction port 102 for a gas to be treated into the reaction tank 101. The first gas introduced from the introduction port 102 for a gas to be treated is brought into contact with industrial water sprayed from the industrial water supply pipe 112 arranged in the upper portion of the reaction tank 101, and the alkaline agent-containing liquid sprayed from the humidifying liquid supply pipe 116 in the stated order (humidifying liquid contact step). The industrial water and the alkaline agent-containing liquid serve as the humidifying liquid. When the first gas is brought into contact with the industrial water and the alkaline agent-containing liquid, the first gas is humidified, and generation of scale in the apparatus due to dryness can be prevented. In addition, the first gas can also be cooled and dust can be removed therefrom through the spraying of the alkaline agent-containing liquid and the industrial water from the humidifying liquid supply pipe 116 and the industrial water supply pipe 112. When dust is removed from the first gas, fine powder, such as dust, is also removed from the second gas at the time of separation of the humidifying liquid in the subsequent humidifying liquid separation step. Accordingly, inhibition of the reaction among the third gas, oxygen, and the alkaline agent due to the fine powder, such as dust, can be prevented, and the reaction can be performed efficiently. Moreover, also part of sulfur oxide, such as $SO_2$, in the first gas is absorbed by the humidifying liquid. The first gas brought into gas-liquid contact with the humidifying liquid as described above, that is, a mixture of the first gas and the humidifying liquid is the second gas.

Then, the second gas collides with the inclined plate 105 or the funnel-shaped liquid collector 106, and the humidifying liquid having absorbed sulfur oxide, such as $SO_2$, in the second gas spontaneously runs over the inclined plate 105 or the funnel-shaped liquid collector 106 and then flows into its central portion. Thus, the second gas separates into a liquid, which is the humidifying liquid having absorbed sulfur oxide, such as $SO_2$, and the third gas (humidifying liquid separation step). The humidifying liquid having fallen flows into the liquid descending pipe 107. In addition, the third gas descends in the reaction tank 101 while passing the outside of the funnel-shaped liquid collector 106 and a wall surface side of the reaction tank 101.

The third gas having descended in the reaction tank 101 is brought into contact with the alkaline agent-containing liquid sprayed from the alkaline agent-containing liquid supply pipe 117 arranged below the funnel-shaped liquid collector 106 and outside the liquid descending pipe 107, the alkaline agent-containing liquid is accumulated in the lower portion of the reaction tank 101, and their contact with oxygen supplied from the oxygen supply pipe 118 is realized. Thus, sulfur oxide in the third gas, oxygen, and the alkaline agent react with each other (sulfur oxide removal step). With this, sulfur oxide, such as $SO_2$, is removed from the third gas.

When sulfur oxide, such as $SO_2$, in the third gas reacts with oxygen and the alkaline agent, solid matter, such as gypsum, which is the by-product, is generated in the same manner as in the first embodiment described above, and sulfur oxide is removed from the third gas. The third gas from which sulfur oxide has been removed through the sulfur oxide removal reaction is discharged from the discharge port 103 for a gas to be treated.

On the other hand, the alkaline agent-containing liquid containing the generated by-product at a high concentration is extracted from the lower portion of the reaction tank 101 with the pump 114 through the pipe 113. The extracted alkaline agent-containing liquid is sprayed in the upper portion of the reaction tank 101 from the humidifying liquid supply pipe 116 through the pipe 115 (circulation step). That is, the alkaline agent-containing liquid after the circulation step serves as the humidifying liquid for the first gas. When the first gas is brought into contact with the alkaline agent-containing liquid serving as the humidifying liquid after the circulation step, the first gas is humidified to become the second gas (humidifying liquid contact step). In addition, part of sulfur oxide, such as $SO_2$, in the first gas is absorbed by the alkaline agent-containing liquid after the circulation step.

The alkaline agent-containing liquid serving as the humidifying liquid after the circulation step having absorbed sulfur oxide, such as $SO_2$, in the second gas collides with the inclined plate 105 or the funnel-shaped liquid collector 106, and the humidifying liquid having absorbed sulfur oxide, such as $SO_2$, in the second gas spontaneously runs over the funnel-shaped liquid collector 106 and then flows into its central portion. Thus, a liquid, which is the humidifying liquid having absorbed sulfur oxide, such as $SO_2$, and the third gas separate from each other (humidifying liquid separation step). The humidifying liquid having fallen flows into the liquid descending pipe 107. In addition, the third gas descends in the reaction tank 101 while passing the outside of the funnel-shaped liquid collector 106 and the wall surface side of the reaction tank 101.

The third gas having descended in the reaction tank 101 while passing the outside of the funnel-shaped liquid collector 106 and the wall surface side of the reaction tank 101 is brought into contact with the alkaline agent-containing liquid sprayed from the alkaline agent-containing liquid supply pipe 117 through the pipe 115, the alkaline agent-containing liquid brought into contact with the third gas is accumulated in the lower portion of the reaction tank 101, and their contact with oxygen supplied from the oxygen supply pipe 118 is realized. Thus, the sulfur oxide removal reaction occurs again.

On the other hand, at least part of the humidifying liquid having flowed into the liquid descending pipe 107 is extracted through the pipe 120 connected to the pump 119 (humidifying liquid acquisition step).

Herein, the alkaline agent-containing liquid serving as the humidifying liquid having flowed into the liquid descending pipe 107 is derived from the alkaline agent-containing liquid accommodated in the reaction tank 101, and hence contains the alkaline agent and the by-product generated through the sulfur oxide removal reaction. In addition, when an oxidation reaction excessively proceeds in the sulfur oxide removal reaction occurring in the alkaline agent-containing liquid 108 accommodated in the reaction tank 101, a peroxide, such as $S_2O_8^{2-}$, which is the oxidizing substance, is generated, and hence the alkaline agent-containing liquid having flowed into the liquid descending pipe 107 contains the oxidizing substance. The oxidizing substance leads to deterioration of the waste water treatment apparatus in the subsequent stage.

However, in this embodiment, the alkaline agent-containing liquid having flowed into the liquid descending pipe 107 is not brought into contact with oxygen after its contact with the first gas in the humidifying liquid contact step, and contains sulfur oxide, such as $SO_2$, in the first gas, which has been contained therein in the humidifying liquid contact step, with the state of sulfur oxide, such as $SO_2$, kept without a reaction.

Accordingly, also in this embodiment, the reaction of reducing the oxidizing substance with sulfur oxide, such as $SO_2$, serving as a reducing agent, for example, the reaction represented by the formula (2) occurs. As a result, deterioration of the waste water treatment apparatus caused by the oxidizing substance can be suppressed.

A gas, such as air, is removed from the alkaline agent-containing liquid serving as the humidifying liquid extracted in the humidifying liquid acquisition step with the air separator 61 arranged in the course of the pipe 120 (gas removal step). The humidifying liquid from which the gas has been removed with the air separator 61 and which has passed through the pump 119 passes through the pipe 121, and then the by-product, such as gypsum, generated through the sulfur oxide removal reaction is removed therefrom by the solid-liquid separation device 122 (by-product recovery step). The humidifying liquid in the liquid descending pipe 107, which is immediately after its contact with the first gas containing sulfur oxide, has a low pH, and hence allows easy dissolution of the alkaline agent. As a result, mixing of the alkaline agent in the by-product generated through the sulfur oxide removal reaction is suppressed, and the humidifying liquid in the liquid descending pipe 107 contains a by-product having a high purity. The humidifying liquid containing the by-product having a high purity as described above is subjected to solid-liquid separation, and hence the by-product, such as gypsum, recovered by the solid-liquid separation device 122 has a high purity. In addition, the air separator 61 enables recovery of the by-product at a high recovery rate despite the fact that the by-product is recovered through only one path.

A liquid obtained through the separation by the solid-liquid separation device 122 is fed to the waste water treatment apparatus, and subjected to waste water treatment for removing a nitrogen compound, a COD, and the like (waste water treatment step). As described above, the oxidizing substance is removed from waste water to be subjected to the waste water treatment, and hence deterioration of the waste water treatment apparatus is suppressed.

In addition, part of the liquid obtained by the solid-liquid separation device passes through the pipe 124 branched from the pipe 123, has the alkaline agent, such as limestone, introduced therein by the alkaline agent introduction device 125 arranged in the course of the pipe 124, is fed to the reaction tank 101, and is reutilized as the alkaline agent-containing liquid for the sulfur oxide removal reaction.

Also in the spray-type desulfurization apparatus 100, the same pot 71 as in the second embodiment may be arranged so as to surround a lower end portion of the liquid descending pipe 107. Further, in the same manner as in the second embodiment, the second oxygen supply pipe 74, the sparger pipe 75, and the like may be arranged in the pot 71 surrounding the lower end of the liquid descending pipe 107 to cause the reaction represented by the formula (1) or the like also in the stage of recovering the humidifying liquid. That is, the following operation may be adopted: the reaction between the oxidizing substance and sulfur oxide represented by the formula (2) or the like is caused in the liquid descending pipe 107 and in the pot 71 in the same manner as in the first embodiment, which realizes a reduction in sulfur oxide, such as $SO_2$. And almost complete elimination of the oxidizing substance; and thereafter, the reaction represented by the formula (1) is caused through introduction of oxygen into the pot 71, which realizes a further reduction in sulfur oxide, such as $SO_2$, and a by-product, such as gypsum, having a high purity.

Illustrated in FIG. 6 is a so-called soot-type desulfurization apparatus formed of one tower in which cooling is performed simultaneously. However, the desulfurization apparatus of the present invention is not limited to the soot type, and cooling may be performed in a separate tower.

EXAMPLES

For further understanding of the present invention, the present invention is described below by way of Examples, which by no means limit the present invention.

Example 1

A desulfurization operation was performed by using the desulfurization apparatus 10 illustrated in FIG. 1. Specifically, in the desulfurization apparatus 10 illustrated in FIG. 1, a coal-fired exhaust gas having a concentration of sulfurous acid ($SO_2$) of about 350 ppm-dry was subjected to desulfurization treatment through use of limestone as an alkaline agent while the pH of the alkaline agent-containing liquid 15 in the alkaline agent-containing liquid chamber 16 was adjusted to 4.50 and a gas was removed with the air separator 61.

Example 2

The same operation as in Example 1 was performed except that the desulfurization apparatus 70 illustrated in FIG. 4 in which the pot 71, the second oxygen supply pipe 74, the sparger pipe 75, and the pipe 77 were added to the desulfurization apparatus illustrated in FIG. 1 was used instead of the desulfurization apparatus illustrated in FIG. 1.

Comparative Example 1

The same operation as in Example 1 was performed except that a desulfurization apparatus 200 illustrated in FIG. 7 which did not include the air separator 61 and was configured to extract the alkaline agent-containing liquid also from a bottom portion of the reaction tank 11 and perform solid-liquid separation of the by-product by the solid-liquid separation device 144 was used instead of the desulfurization apparatus illustrated in FIG. 1.

The ratios (purities) of calcium carbonate ($CaCO_3$) and gypsum ($CaSO_4 \cdot 2H_2O$) in solid matter obtained by the solid-liquid separation device in Examples 1 and 2 and Comparative Example 1 were determined by a method according to JIS R9101:1995. It should be noted that, in Comparative Example 1, the purities of calcium carbonate and gypsum were determined for solid matter obtained by the solid-liquid separation device 144, which performed treatment on the alkaline agent-containing liquid extracted from the bottom portion of the reaction tank 11. In addition, in Comparative Example 1, the amount of solid matter obtained by the solid-liquid separation device 44 was much smaller than the amount of the solid matter obtained by the solid-liquid separation device 144. The results are shown in Table 1. It should be noted that calcium carbonate and gypsum generally contain some water, and hence their purities shown in Table 1 are each calculated in the state in which the amount of water is subtracted from a denominator (amount of solid matter) (represented as "wt %-dry" in Table 1).

In addition, in Example 2, the alkaline agent-containing liquid in the alkaline agent-containing liquid chamber 16 and waste water fed to the waste water treatment apparatus through the pipe 45 were each measured for the concentration of the oxidizing substance by a method according to JIS K0102:2010. The results are shown in Table 2.

As shown in Table 1, in each of Examples 1 and 2, the content ratio of the alkaline agent ($CaCO_3$) was low and the purity of gypsum ($CaSO_4 \cdot 2H_2O$) was high as compared to Comparative Example 1. In particular, in Example 2, the reaction represented by the formula (1) was allowed to further proceed as compared to Example 1 by arranging the pot and adjusting an oxygen supply amount, and thus the purity of gypsum was able to be increased. In addition, as is apparent from Table 2, the concentration of the oxidizing substance in waste water is significantly reduced in the present invention.

TABLE 1

|  | Purity of $CaCO_3$ (wt %-dry) | Purity of $CaSO_4 \cdot 2H_2O$ (wt %-dry) |
| --- | --- | --- |
| Example 1 | 0.030 | 95.300 |
| Example 2 | 0.170 | 98.400 |
| Comparative Example 1 | 0.220 | 95.000 |

TABLE 2

|  | Alkaline agent-containing liquid chamber | Waste water treatment apparatus |
| --- | --- | --- |
| Concentration of oxidizing substance (mg/L) | 10 | 0.5 |

This application claims the benefit of priority from Japanese Patent Application No. 2013-208192, filed on Oct. 3, 2013, the content of which is incorporated herein by reference.

REFERENCE SIGNS LIST 10, 60, 70, 100 desulfurization apparatus
11, 101 reaction tank
12, 102 introduction port for gas to be treated
13, 103 discharge port for gas to be treated
14 humidifying liquid contact chamber
15 alkaline agent-containing liquid
16 alkaline agent-containing liquid chamber
17 discharge chamber for gas to be treated
18 first partition wall
19 second partition wall
21, 109 liquid level
22 gas descending pipe
23 first liquid descending pipe
24 second liquid descending pipe
25 communicating pipe
26 space portion
27 stirrer
28 let bubbling layer
31, 33, 35, 42, 43, 45, 47, 77, 80, 82, 111, 113, 115, 102, 121, 123, 124 pipe
32 industrial water supply pipe
34, 41, 81, 109, 114, 119 pump
36 first humidifying liquid supply pipe
37 second humidifying liquid supply pipe
38 oxygen supply pipe
39 let bubbling layer
44, 122, 144 solid-liquid separation device
48, 125 alkaline agent introduction device
51 weir plate
51a bent portion
51b inclined portion
61 air separator
71 pot
72 side wall
73 bottom plate
74 second oxygen supply pipe
75 sparger pipe
76 tilted plate
104 separation plate
105 inclined plate
106 funnel-shaped liquid collector
107 liquid descending pipe
108 alkaline agent-containing liquid
112 industrial water supply pipe
116 humidifying liquid supply pipe
117 alkaline agent-containing liquid supply pipe
118 oxygen supply pipe

The invention claimed is:
1. A desulfurization method for a gas containing sulfur oxide, the desulfurization method comprising:

a humidifying liquid contact step of bringing a first gas containing sulfur oxide into contact with a humidifying liquid to obtain a second gas containing the humidifying liquid, where the sulfur oxide contained in the first gas is partially absorbed into the humidifying liquid;

a humidifying liquid separation step of separating at least part of the humidifying liquid from the second gas to obtain a third gas, where the third gas still contains the sulfur oxide;

a sulfur oxide removal step of bringing the third gas into contact with an alkaline agent-containing liquid and supplying oxygen into the alkaline agent-containing liquid to remove the remaining sulfur oxide from the third gas, where the sulfur oxide is absorbed into the alkaline agent-containing liquid and reacts with the alkaline agent and oxygen to generate a by-product through the reaction in the liquid;

a circulation step of circulating the alkaline agent-containing liquid brought into contact with the third gas and oxygen into the humidifying liquid contact step to use the circulated alkaline agent-containing liquid as the humidifying liquid to be brought into contact with the first gas where, any oxidizing substances in the circulated alkaline agent-containing liquid are reduced by the first gas;

a humidifying liquid acquisition step of acquiring at least part of the humidifying liquid separated from the second gas in the humidifying liquid separation step; and a by-product recovery step of recovering the by-product from the humidifying liquid arranged downstream of the humidifying liquid acquisition step.

2. A desulfurization method for a gas containing sulfur oxide according to claim 1, wherein the humidifying liquid acquisition step comprises adding oxygen to the humidifying liquid to generate the by-product also in the humidifying liquid.

3. A desulfurization method for a gas containing sulfur oxide according to claim 1, wherein:
the sulfur oxide comprises $SO_2$;
the alkaline agent is calcium carbonate; and
the by-product is gypsum.

* * * * *